No. 832,626. PATENTED OCT. 9, 1906.
O. W. SCHAUM.
ANTIVIBRATION DEVICE FOR VEHICLES.
APPLICATION FILED JAN. 2, 1906.
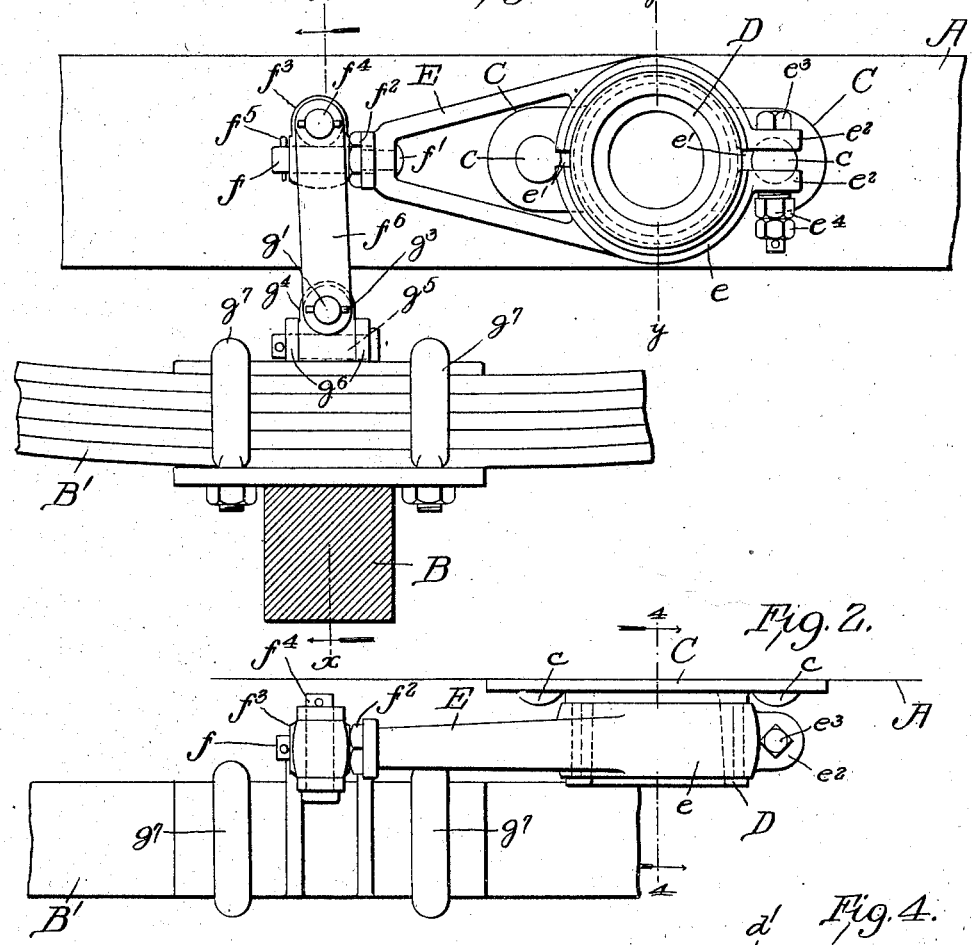
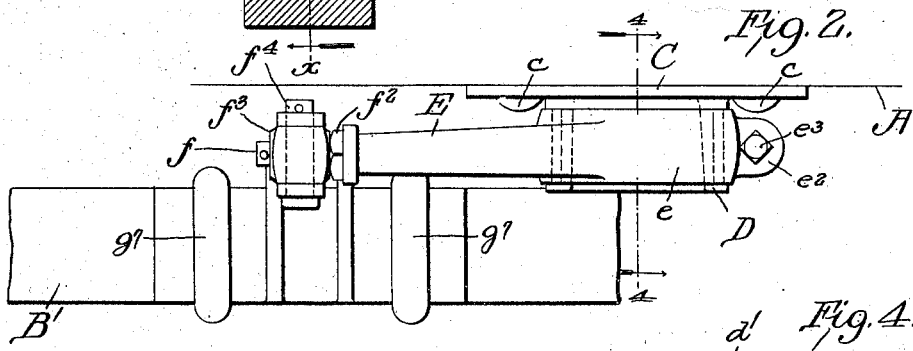
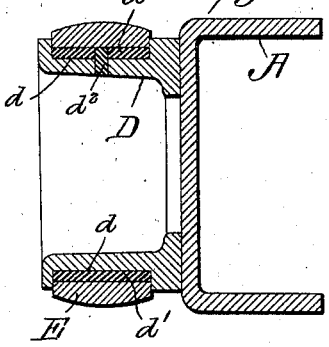
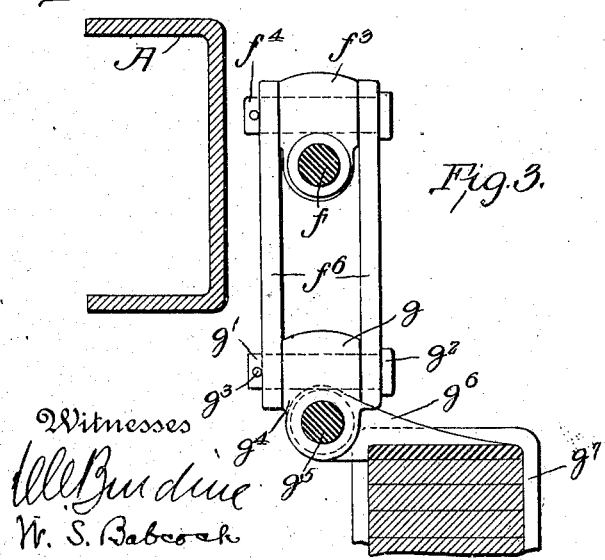
Witnesses
Inventor
Otto W. Schaum
By
Attorney

UNITED STATES PATENT OFFICE.

OTTO W. SCHAUM, OF PHILADELPHIA, PENNSYLVANIA.

ANTIVIBRATION DEVICE FOR VEHICLES.

No. 832,626.      Specification of Letters Patent.      Patented Oct. 9, 1906.

Application filed January 2, 1906. Serial No. 294,215.

*To all whom it may concern:*

Be it known that I, OTTO W. SCHAUM, a citizen of the United States, residing at Philadelphia, in the county of Philadelphia and State of Pennsylvania, have invented certain new and useful Improvements in Antivibration Devices for Vehicles, of which the following is a specification.

The invention to be hereinafter described relates to antivibration devices or shock-absorbers for vehicles, of which the following, in connection with the accompanying drawings, is a full, clear, and exact description.

Ordinarily vehicles comprise a suitable running-gear and a body portion, elastic means being disposed between the two to overcome excessive vibration and shock to the body portion caused by inequalities or obstacles in the road. The elastic means or springs disposed between the running-gear and body, if possessing the requisite elasticity to overcome the transmission of vibration and shock, have the disadvantage of such quick recoil or return to normal condition that a violent oscillation of the body portion is caused, tending to ruinous wear and tear upon the vehicle and great discomfort to the occupants. To overcome this objectionable motion, means have been devised with a view of retarding the action of the springs or other elastic means; but in such devices there has been binding, bending, and excessive wearing of parts because consideration has not been given the lateral and longitudinal motions to which the body portion of the vehicle is subjected, independent of the running-gear, due to side and end disturbing forces—such, for instance, as centrifugal force tending to move the body portion laterally of the running-gear in turning corners or the endwise momentum of the body portion tending to move it longitudinally of the running-gear in suddenly changing direction from the horizontal, due to inequalities in the road-bed.

With the above considerations in view the object of the present invention is to provide an antivibration device of simple construction, which may be readily attached to any vehicle and allow universal motion of the body portion independent of the running-gear or other part to which it is connected without danger of bending, binding, or breaking and which may be readily and easily adjusted by unskilled persons to the required amount of retarding force desired.

The invention may be modified, utilized, and applied in various ways; and it consists of the parts and combinations hereinafter described, and definitely pointed out in the claims.

In the drawings, which show one form or embodiment of the invention, Figure 1 represents a side elevation of the antivibration device as attached to the suspended or body portion and the running-gear of a vehicle, parts being broken away. Fig. 2 is a plan view of the same. Fig. 3 is a section of the device on line $x\ x$, Fig. 1; and Fig. 4 is a like section on line $y\ y$, Fig. 1.

The suspended or body portion of the vehicle, which may be of any usual or desired character, is represented at A, only so much thereof being shown as is necessary to make clear the application of the present invention. To the axle B is secured the spring or elastic supporting means B′, which in the present illustration is shown as an ordinary form of bow-spring, it being evident that this elastic supporting means for the body of the vehicle may be varied according to the taste or judgment of the constructor and interposed between the axle B and body portion A, as circumstances may dictate.

In the form of the invention selected for illustration a bracket C is secured to the frame of the vehicle-body in suitable manner, as by means $c\ c$, so that it is practically rigid therewith. Projecting outward from the bracket C is a friction-drum D, having a recessed peripheral portion $d$, in which is fitted some suitable antifriction material $d'$—such as leather, fiber, rubber, or the like—and, if desired, such friction material may be secured to the friction-drum D by means of pins $d^2$, Fig. 4. Mounted upon the friction-drum D and surrounding the frictional material $d'$ is the circular portion $e$ of a friction-arm E, such circular portion $e$ being preferably divided or split, as at $e'\ e'$, and provided with projecting lugs $e^2$ at one side, which are connected by the bolt $e^3$, on which suitable nuts $e^4$ may be placed, whereby the frictional engagement of the circular portion of the friction-arm upon the friction material $d'$ may be varied to suit existing conditions, as will be obvious. The free end of the friction-arm E is connected to the running-gear of the vehicle by a universal-jointed device, to be described, whereby as the vehicle-body moves horizontally either forward or backward or transversely of the running-gear all binding, breaking, or distortion of the antivibration device is avoided. As one of the means for thus connecting the friction-arm E to the running-gear the following device is employed: Secured to the end of the arm E is a bolt or stud $f$, said bolt or stud being preferably screw-threaded and having a head $f'$, whereby by means of suitable nuts $f^2$ said stud may be rigidly fixed to the end of the friction-arm. Journaled upon the friction-stud $f$ is the yoke $f^3$, having an upwardly-extending portion through which passes a stud $f^4$, arranged at right angles to the stud $f$, a cotter-pin $f^5$ being employed as a preferred means for holding the yoke $f^3$ upon the stud $f$. Upon the projecting portions of the stud $f^4$ are journaled the links $f^6$, which are connected at their lower ends to a yoke $g$ by means of a pin or stud $g'$, arranged parallel to the stud $f^4$, said stud or pin $g'$ being preferably provided with a head $g^2$ and a cotter-pin $g^3$ for holding the links $f^6$ in engagement with the yoke $g$. The yoke $g$ is likewise provided with a depending lug portion $g^4$, through which passes a stud or pin $g^5$ at right angles to the pin or stud $g'$, said stud or pin $g^5$ being in engagement with suitable ears arranged on a bracket $g^6$, which may be secured to the running-gear in any approved manner. In the present form of the invention the bracket $g^6$ is disclosed as secured to the running-gear by means of clamps $g^7$, which connect the springs B' to the axle B.

From the construction thus far described it will be noted that as the vehicle passes over the road-bed the usual springs B' of desired form take up the ordinary vibrations due to slight irregularities in the road; but when by reason of increased irregularities or high speed of the vehicle undue vibration would be caused by the springs B' the antivibration device is brought into action and imparts retarding effect to the movement of the vehicle-body upward or downward with respect to the running-gear, thereby releasing the vehicle-body from the sudden and wearing strains due to such sudden vibratory action. It is desirable in a device of this character that the retarding effect of the antivibration device be readily adjustable to suit conditions either of the road-bed or speed, and by the means employed it will be obvious that any one, however little skilled he may be in mechanical matters, may readily adjust the frictional retarding effect of said device by merely setting up or loosening the nuts $e^4$ on the bolt $e^3$, connecting the circular portion of the friction-arm about the friction material $d'$. It is obvious, of course, that other forms of means may be employed for adjusting the tension or frictional resistance of the circular portions of the friction-arm within the scope of the present invention.

Under ordinary running conditions there is considerable horizontal movement of the vehicle-body independent of the running-gear, and this movement may be either longitudinally of the vehicle-body or transversely thereof. For instance, in rounding corners under high speed the centrifugal force brought into action will ordinarily carry the vehicle-body more or less to one side of the running-gear, and if no means is provided to accommodate this independent movement of the vehicle-body the antivibration device when employed will bind, bend, break, or be subjected to distortion. In the present device, however, by virtue of the universal-jointed connection comprised as part of the antivibration device it is obvious that not only can the independent longitudinal movement of the vehicle-body take place without distortion or binding of the antivibration device, but also the sidewise or transverse independent movement of the vehicle-body may take place without in any wise injuring or detracting from the efficiency of the antivibration device. Especially are these defects in the old forms of antivibration devices apparent in motor-vehicles where high speeds are maintained over rough and uneven roads and in rounding bends and corners therein, and it therefore becomes of great importance that means such as hereinbefore described be provided to accommodate for the movements of the vehicle-body horizontally independent of the running-gear without injurious effects being transmitted to the antivibration device.

In the present embodiment of the invention a particular form of yokes and pins arranged at right angles to each other have been shown and described as furnishing a form of connection between the antivibration device and one of the relatively movable parts between which it is placed; but it is to be understood, of course, that the invention is not restricted in this respect, it being directed to a form of connection embodying means for permitting movement of the vehicle-body horizontally with respect to the running-gear without distortion or injurious effects upon the antivibration device, and obviously many variations may be made in these details without departing from the spirit of the present invention.

Having thus described my invention, what I claim, and desire to secure by Letters Patent, is—

1. An antivibration device for vehicles employing an elastic supporting means between parts relatively movable with respect to each other, said antivibration device comprising a friction-drum, means for connecting it to one of the relatively movable parts, an arm in frictional engagement with said drum, and a universal-jointed connection for joining said arm to the other of said relatively movable parts.

2. An antivibration device for vehicles having a relatively movable body portion and running-gear, said antivibration device comprising a friction-drum adapted to be secured to one of said parts, a friction-arm, and means including a universal joint for connecting said arm to the other of said parts to permit said means to yield and avoid injury or binding of the said means or antivibration device upon independent horizontal movement of said parts of the vehicle.

3. An antivibration device for vehicles having a body portion and running-gear, said antivibration device comprising a friction-drum adapted to be secured to one of said parts and having friction material thereon, a friction-arm having a portion embracing said drum, means for adjusting the frictional engagement of said portion and drum, and means for pivotally connecting the said friction-arm with the part of the vehicle to which the drum is not connected, said connecting means comprising universal joints.

4. In a vehicle comprising a running-gear and body portion, a friction-drum, means for connecting it to one of said parts, a friction-arm having a portion extending about said drum, links adapted to extend between the friction-arm and the part of the vehicle to which the drum is not connected and a yoke and right-angle pin connections constituting a universal joint between said friction-arm and said links.

5. In a vehicle, a running-gear portion and a body portion, springs disposed between them, a friction-drum secured to one of said portions, a friction-arm having a part embracing said friction-drum, means for adjusting the frictional engagement of said arm with said drum, a link and universal-jointed connections between said link and the friction-arm, and between the links and the running-gear.

In testimony whereof I affix my signature in presence of two witnesses.

OTTO W. SCHAUM.

Witnesses:
   JOHN THIEL,
   A. KING DICKSON.